(12) United States Patent
McDaniel, Jr.

(10) Patent No.: US 9,580,923 B2
(45) Date of Patent: Feb. 28, 2017

(54) MODULAR SHELTER SYSTEMS AND METHODS

(71) Applicant: Reaction, Inc., Austin, TX (US)

(72) Inventor: Michael D. McDaniel, Jr., Austin, TX (US)

(73) Assignee: Reaction, Inc., Austin, TX (US)

( * ) Notice: Subject to any disclaimer, the term of this patent is extended or adjusted under 35 U.S.C. 154(b) by 0 days.

(21) Appl. No.: 14/990,138

(22) Filed: Jan. 7, 2016

(65) Prior Publication Data

US 2016/0194891 A1 Jul. 7, 2016

Related U.S. Application Data

(60) Provisional application No. 62/100,793, filed on Jan. 7, 2015.

(51) Int. Cl.
*E04F 19/00* (2006.01)
*E04H 1/12* (2006.01)
*H04W 48/00* (2009.01)
*H04W 84/18* (2009.01)

(52) U.S. Cl.
CPC .......... *E04H 1/1205* (2013.01); *H04W 48/00* (2013.01); *H04W 84/18* (2013.01)

(58) Field of Classification Search
CPC ... E04H 1/1205; E04B 1/34815; H04W 84/18
USPC ........................ 52/36.4, 79.1, 79.2, 79.5, 83
See application file for complete search history.

(56) References Cited

U.S. PATENT DOCUMENTS

| | | | |
|---|---|---|---|
| 2,236,677 A | 4/1941 | Eddy | |
| 2,485,914 A | 10/1949 | Owens | |
| 2,910,994 A | 11/1959 | Joy | |
| 2,932,304 A | 4/1960 | Voege | |
| 3,116,949 A | 1/1964 | Muse | |
| 3,256,440 A | 6/1966 | Virgil | |
| 3,478,472 A | 11/1969 | Kwake | |
| 3,498,011 A | 3/1970 | Lindgren | |
| 3,566,554 A | 3/1971 | Schaffer | |
| 3,629,874 A | 12/1971 | Beller | |
| 3,702,617 A | 11/1972 | Franzen | |
| 3,703,181 A | 11/1972 | Tholen | |
| 3,835,480 A | 9/1974 | Harding | |
| 3,923,134 A | 12/1975 | Rezazadeh | |
| 3,932,925 A | 1/1976 | Harding | |
| 3,949,528 A | 4/1976 | Hartger | |
| 4,031,572 A | 6/1977 | Harding | |
| 4,031,573 A | 6/1977 | Romanoff | |
| 4,128,204 A | 12/1978 | Wade | |
| 4,514,938 A | 5/1985 | Maguire | |
| 4,655,013 A | 4/1987 | Ritland | |

(Continued)

FOREIGN PATENT DOCUMENTS

| | | |
|---|---|---|
| DE | 2208942 A1 | 9/1973 |
| DE | 19537535 A1 | 3/1997 |

(Continued)

OTHER PUBLICATIONS

Brucksch, European Search Report for European Application No. 16150442, Jul. 8, 2016, 9 pages.

*Primary Examiner* — Basil Katcheves
(74) *Attorney, Agent, or Firm* — Fish & Richardson P.C.

(57) ABSTRACT

A modular shelter includes a base; and a unibody shell coupled to the base, the shell formed to include a roof and at least one side to define an indoor human-occupiable environment substantially enclosed within the base and the shell.

23 Claims, 12 Drawing Sheets

(56) References Cited

U.S. PATENT DOCUMENTS

| | | |
|---|---|---|
| 4,664,438 A | 5/1987 | Crepaldi |
| 4,771,581 A | 9/1988 | Nill |
| 4,802,500 A | 2/1989 | Davis |
| 4,887,627 A | 12/1989 | Audet |
| 4,942,895 A | 7/1990 | Lynch |
| 5,007,212 A | 4/1991 | Fritts |
| 5,033,493 A | 7/1991 | Senchuck |
| 5,036,638 A | 8/1991 | Kurtz |
| 5,065,462 A | 11/1991 | Romano |
| 5,093,941 A | 3/1992 | Muller |
| 5,133,378 A | 7/1992 | Tanasychuk |
| 5,222,513 A | 6/1993 | Hilliard |
| 5,319,904 A | 6/1994 | Pascoe |
| 5,398,465 A | 3/1995 | Tagg |
| 5,423,150 A | 6/1995 | Hitchcock |
| 5,426,900 A | 6/1995 | Springer |
| 5,489,052 A | 2/1996 | Blood |
| 5,615,521 A | 4/1997 | Simerka |
| 5,749,387 A | 5/1998 | Thompson |
| 5,791,293 A | 8/1998 | Northrop |
| 5,901,727 A | 5/1999 | Kramer |
| 5,916,096 A | 6/1999 | Wiesmann |
| 5,918,614 A | 7/1999 | Lynch |
| 5,921,043 A | 7/1999 | McDonald |
| 5,964,065 A | 10/1999 | Migurski |
| 6,131,343 A | 10/2000 | Jackson |
| 6,192,633 B1 | 2/2001 | Hilbert |
| 6,250,022 B1 | 6/2001 | Paz |
| 6,418,672 B1 | 7/2002 | Hampel |
| 6,439,120 B1 | 8/2002 | Bureaux |
| 6,467,221 B1 | 10/2002 | Bigelow |
| 6,739,095 B2 | 5/2004 | Glynos |
| 6,748,962 B2 | 6/2004 | Miller |
| 6,766,623 B1 | 7/2004 | Kalnay |
| 6,948,280 B2 | 9/2005 | Marcinkowski |
| 6,973,758 B2 | 12/2005 | Zeik |
| 7,207,076 B2 | 4/2007 | Gardner |
| 7,213,374 B2 | 5/2007 | Harris |
| D564,615 S | 3/2008 | Ruben |
| 8,002,141 B2 | 8/2011 | Duffield |
| 8,042,562 B1 | 10/2011 | McDaniel |
| 2001/0007260 A1 | 7/2001 | Rousselle |
| 2002/0056247 A1 | 5/2002 | Williams |
| 2002/0153033 A1 | 10/2002 | Miller |
| 2003/0024173 A1 | 2/2003 | Cohen |
| 2004/0222336 A1 | 11/2004 | Miller |
| 2005/0055893 A1 | 3/2005 | Goodwin |
| 2005/0076584 A1 | 4/2005 | Loranger |
| 2005/0189009 A1 | 9/2005 | Walter |
| 2005/0189010 A1 | 9/2005 | Sumner |
| 2005/0241593 A1 | 11/2005 | Kaura |
| 2006/0048459 A1 | 3/2006 | Moore |
| 2006/0055193 A1 | 3/2006 | Colborne |
| 2006/0103154 A1 | 5/2006 | Berry |
| 2006/0107903 A1 | 5/2006 | Jin |
| 2007/0074462 A1 | 4/2007 | Linares |
| 2007/0157890 A1 | 7/2007 | Kaura |
| 2008/0016792 A1 | 1/2008 | Messman |
| 2008/0302809 A1 | 12/2008 | Duffield |
| 2009/0235445 A1 | 9/2009 | Goldstein |
| 2009/0272415 A1 | 11/2009 | Zepeda |
| 2015/0143758 A1 | 5/2015 | McDaniel |
| 2015/0197930 A1 | 7/2015 | McDaniel |

FOREIGN PATENT DOCUMENTS

| | | |
|---|---|---|
| DE | 29806139 U1 | 8/1999 |
| EP | 947312 A1 | 10/1999 |
| FR | 2604463 B1 | 9/1991 |
| FR | 2725227 A1 | 4/1996 |
| JP | 2010024818 A | 2/2010 |

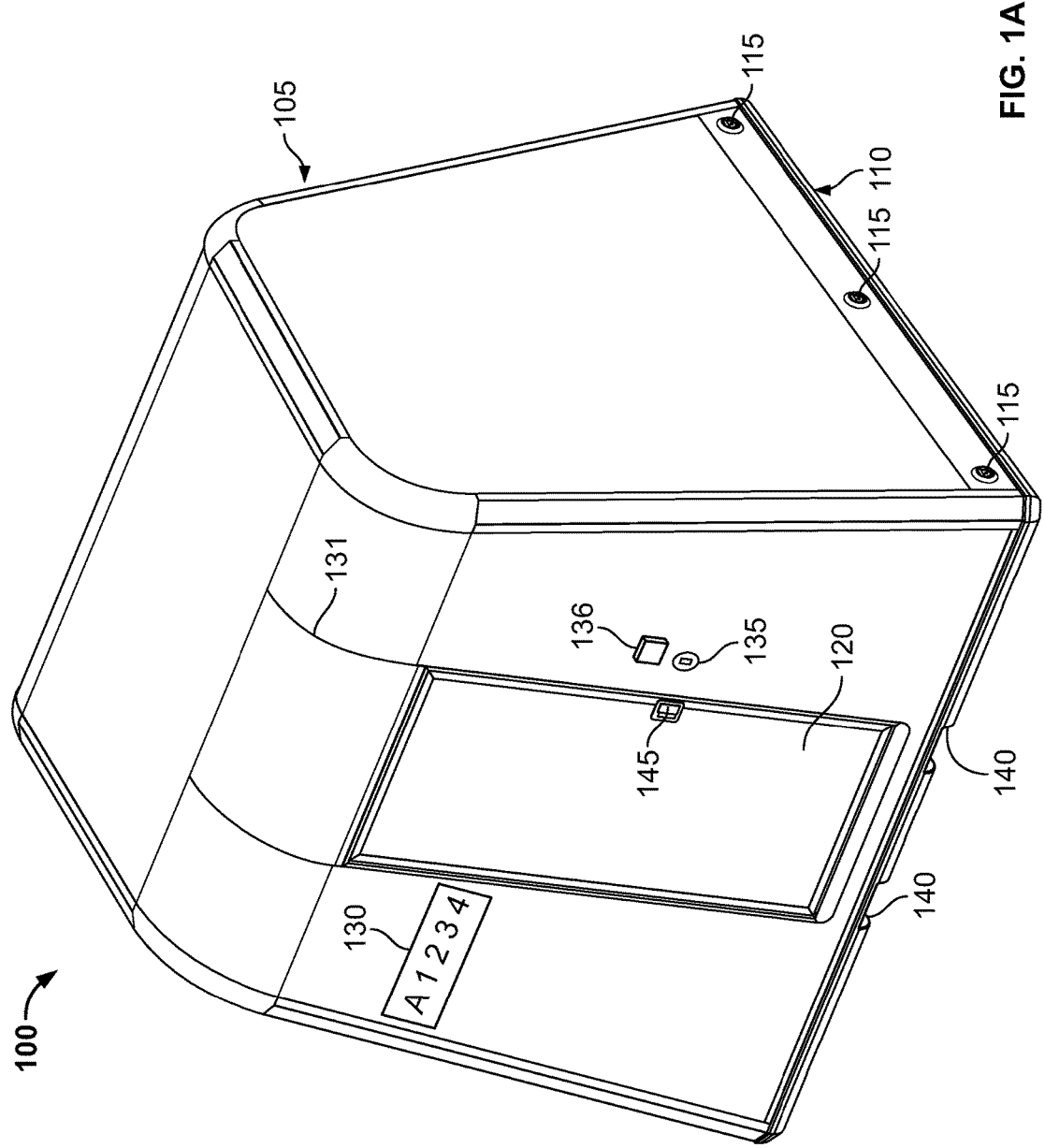

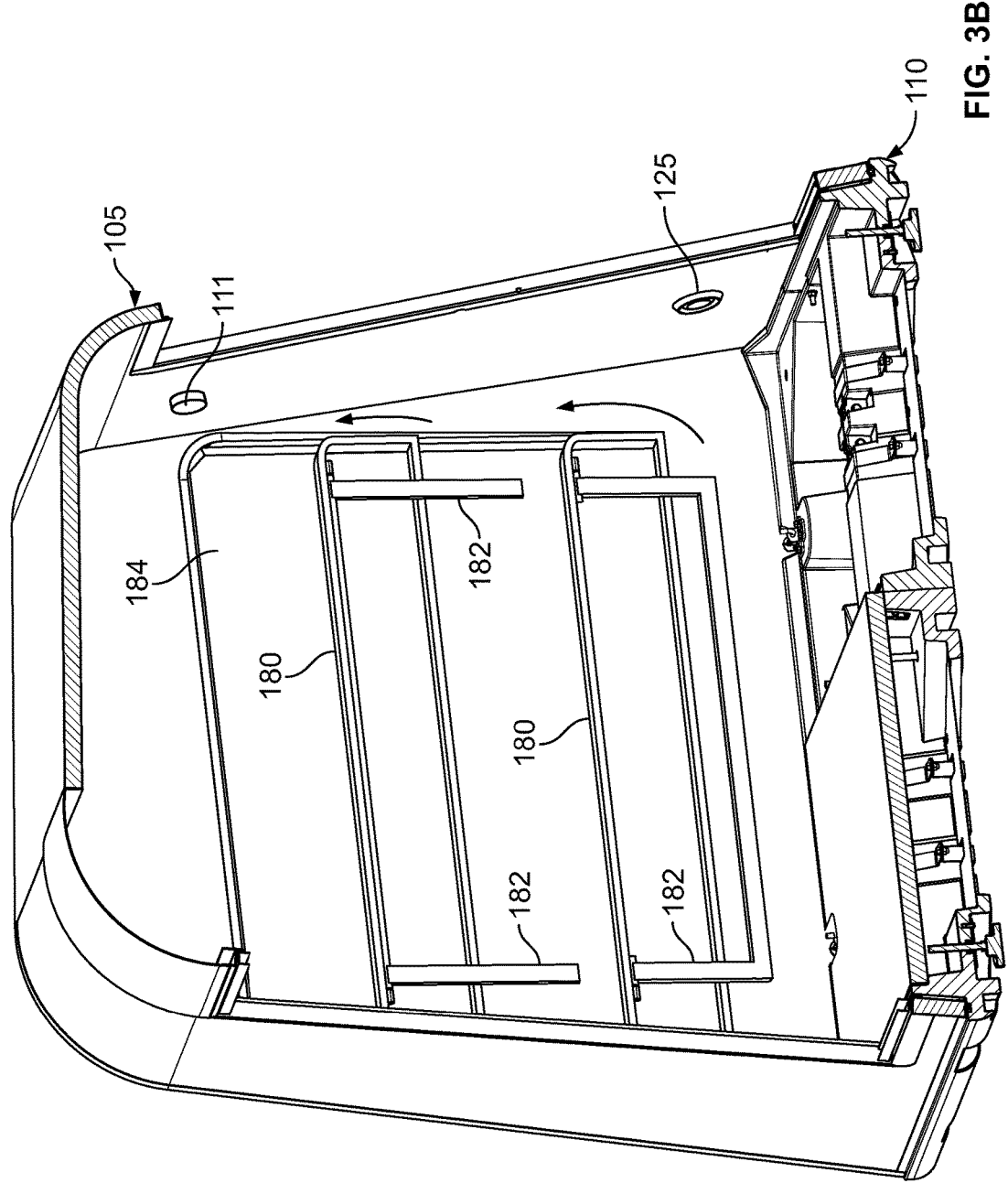

MODULAR SHELTER SYSTEMS AND METHODS

CROSS-REFERENCE TO RELATED APPLICATION

This application claims priority under 35 U.S.C. §119 to U.S. Provisional Patent Application Ser. No. 62/100,793, entitled "Modular Shelter Systems and Methods," and filed on Jan. 7, 2015, the entire contents of which are hereby incorporated by reference.

TECHNICAL BACKGROUND

This disclosure describes a modular shelters, modular shelter systems, and associated methods therefor.

BACKGROUND

After natural and man-made disasters, housing needs include short-term housing, medium-term housing, and long-term housing. A few types of specific disasters can be forecast, such as hurricanes, which create a different housing need and a fourth period: pre-event sheltering. The general housing needs during and between those periods are drastically different. Likewise, short-term housing is often desirable during social gatherings that extend beyond a twenty-four period, such as weekend music festivals and other gatherings where conventional permanent housing structures (e.g., motels, hotels, inns, etc.) are inconvenient or impractical. Further, in such gatherings and others, conventional temporary housing (e.g., tents, open-air shelters, campers, motorhomes, recreational vehicles, and otherwise) may not be adequate or practical for organizers or participants.

SUMMARY

A general implementation of a modular shelter includes a base; and a unibody shell coupled to the base, the shell formed to include a roof and at least one side to define an indoor human-occupiable environment substantially enclosed within the base and the shell.

In an aspect combinable with the general implementation, the unibody shell includes a core structure sandwiched between an inner skin surface and an outer skin surface, the core structure including a honeycomb or fluted member.

In an aspect combinable with any of the previous aspects, the core structure includes an insulation layer of the unibody shell.

In an aspect combinable with any of the previous aspects, the roof and side are thermally fused together.

In an aspect combinable with any of the previous aspects, the unibody shell includes at least one door opening.

An aspect combinable with any of the previous aspects further includes at least one of: a plurality of lifting lugs positioned on at least one of the unibody shell or the base; or a plurality of hand lift spaces formed on at least one of the unibody shell and/or the base.

In an aspect combinable with any of the previous aspects, the base includes a structural web member that includes a fillable volume.

In an aspect combinable with any of the previous aspects, the base includes a plurality of adjustable leveling legs configured to level the modular shelter on a surface.

An aspect combinable with any of the previous aspects further includes a ledge that extends along a perimeter of the base and includes a mounting surface for the unibody shell; a gasket positioned on the mounting surface that at least partially seals an interface between the unibody shell and the base; and one or more latches that secure the unibody shell to the base.

An aspect combinable with any of the previous aspects further includes a furniture member connected to the interior surface of the side.

In an aspect combinable with any of the previous aspects, the furniture member moveable between a deployed position such that the furniture member extends into the indoor human-occupiable environment and a stored position in which the furniture member is positioned in the recess.

In an aspect combinable with any of the previous aspects, the furniture member includes at least one of a bed, a desk, a table, a shelf, or a plumbing fixture.

In an aspect combinable with any of the previous aspects, the indoor human-occupiable environment is sized to receive a portion of another modular shelter therein.

An aspect combinable with any of the previous aspects further includes a main control system and a plurality of sub-control systems that include at least one of: a lighting control system configured to control one or more lights mounted in the modular shelter; a display control system configured to control a digital display mounted on an exterior surface of the unibody shell; or a security control system configured to control access into the indoor human-occupiable environment.

In an aspect combinable with any of the previous aspects, the main control system is configured to wirelessly communicate to a remote computing system.

In another general implementation, a modular shelter system includes a plurality of modular shelters, each of the modular shelters including a base, and a unibody shell coupled to the base, the shell formed to include a roof and at least one side to define an indoor human-occupiable environment substantially enclosed within the base and the shell; and a main controller positionable to generate a mesh network to communicate with the plurality of modular shelters through the mesh network.

In an aspect combinable with the general implementation, the main controller is configured to wirelessly communicate data through the mesh network to a remote monitoring system.

In an aspect combinable with any of the previous aspects, the data includes at least one of position data, status data, message data, location data, orientation data, occupancy data, and/or configuration data.

In an aspect combinable with any of the previous aspects, the main control system is configured to communicate data to a remote data storage device for subsequent retrieval by the main control system or remote monitoring system.

In an aspect combinable with any of the previous aspects, respective unibody shells of the plurality of modular shelters are nestable, and respective bases of the plurality of modular shelters are stackable.

In another general implementation, a method for deploying a plurality of modular shelters includes receiving a plurality of unibody shells of respective modular shelters, a first unibody shell nested within a volume of a second unibody shell, each of the first and second unibody shells including respective furniture members installed to the unibody shells in a stored position; removing the first shell from within the second shell; and adjusting the furniture member of the second shell from the stored position to a deployed position such that the furniture member extends into the volume of the second shell.

An aspect combinable with the general implementation further includes setting the first unibody shell on a first base to form a first modular shelter; setting the second unibody shell on a second base to form a second modular shelter; and connecting the respective unibody shells to the respective bases.

An aspect combinable with any of the previous aspects further includes adjusting the furniture member of the first unibody shell from the stored position to a deployed position such that the furniture member extends into a volume of the first unibody shell.

An aspect combinable with any of the previous aspects further includes unstacking the first base from the second base prior to connecting the respective unibody shells to the respective bases.

An aspect combinable with any of the previous aspects further includes connecting electrical power to at least one of the plurality of modular shelters.

Another general implementation of a modular shelter includes a base; and a shell coupled to the base, the shell formed to include a roof and at least one side to define an indoor human-occupiable environment substantially enclosed within the base and the shell.

In an aspect combinable with the general implementation, the shell includes a unibody shell.

In a further aspect combinable with any of the previous aspects, the unibody shell includes at least one skin surface that covers a honeycomb, fluted, solid core, porous core, or other structure.

In a further aspect combinable with any of the previous aspects, the unibody shell includes at least a honeycomb, fluted, solid core, porous core, or other structure sandwiched between an inner skin surface and an outer skin surface.

In a further aspect combinable with any of the previous aspects, the honeycomb, fluted, solid core, porous core, or other structure provides structural integrity to the unibody shell.

In a further aspect combinable with any of the previous aspects, the honeycomb, fluted, solid core, porous core, or other structure includes an insulation layer of the unibody shell.

In a further aspect combinable with any of the previous aspects, the honeycomb, fluted, solid core, porous core, or other structure includes polypropylene.

In a further aspect combinable with any of the previous aspects, the roof and side are thermally fused together.

In a further aspect combinable with any of the previous aspects, the unibody shell includes at least one door opening.

A further aspect combinable with any of the previous aspects further includes a door positioned in the door opening.

In a further aspect combinable with any of the previous aspects, the door includes one of a plurality of distinct door configurations that are positionable in the door frame.

A further aspect combinable with any of the previous aspects further includes a plurality of lifting lugs positioned on the unibody shell and/or the base.

In a further aspect combinable with any of the previous aspects, the plurality of lifting lugs include pivotable rings.

A further aspect combinable with any of the previous aspects further includes a plurality of hand lift spaces formed on the unibody shell and/or the base.

In a further aspect combinable with any of the previous aspects, the base includes fork slots that extend between opposed sides of the base.

In a further aspect combinable with any of the previous aspects, the base includes a structural web member.

In a further aspect combinable with any of the previous aspects, the structural web member of the base includes a fillable volume to increase a weight of the base.

In a further aspect combinable with any of the previous aspects, the base includes a plurality of adjustable leveling legs configured to level the modular shelter on a surface.

In a further aspect combinable with any of the previous aspects, the adjustable leveling legs are mounted in voids of the structural web member of the base.

In a further aspect combinable with any of the previous aspects, the base includes a ledge that extends along a perimeter of the base and includes a mounting surface for the unibody shell.

A further aspect combinable with any of the previous aspects further includes a gasket positioned on the mounting surface that at least partially seals an interface between the unibody shell and the base.

A further aspect combinable with any of the previous aspects further includes one or more latches that secure the unibody shell to the base.

In a further aspect combinable with any of the previous aspects, an interior surface of the side of the unibody shell includes a recess.

A further aspect combinable with any of the previous aspects further includes a furniture member connected to the interior surface of the side.

In a further aspect combinable with any of the previous aspects, the furniture member is moveable between a deployed position such that the furniture member extends into the indoor human-occupiable environment and a stored position in which the furniture member is positioned in the recess.

In a further aspect combinable with any of the previous aspects, the furniture member includes at least one of a bed, a desk, a table, a shelf, or a plumbing fixture.

In a further aspect combinable with any of the previous aspects, the plumbing fixture includes at least one of sink or a toilet.

In a further aspect combinable with any of the previous aspects, the plumbing fixture is fluidly coupled to a potable water inlet that is located at or near a perimeter or edge of the base.

In a further aspect combinable with any of the previous aspects, the plumbing fixture is fluidly coupled to a sewer outlet that is located at or near a perimeter or edge of the base.

In a further aspect combinable with any of the previous aspects, the plumbing fixture is fluidly coupled with a piping system that extends within void areas of the base and is covered by a screen that extends across the void areas.

In a further aspect combinable with any of the previous aspects, the piping system includes PVC pipe.

In a further aspect combinable with any of the previous aspects, the indoor human-occupiable environment is sized to receive a portion of another modular shelter therein.

In a further aspect combinable with any of the previous aspects, the side of the unibody shell is angularly directed inward from the base to the roof.

In a further aspect combinable with any of the previous aspects, the angular direction of the side is between about 5-10 degrees or about 8 degrees.

In a further aspect combinable with any of the previous aspects, the side is one of a plurality of sides and each of the plurality of sides is angularly directed inward from the base to the roof at between about 5-10 degrees and preferably at about 8 degrees.

In a further aspect combinable with any of the previous aspects, a front edge of the roof is taller than a back edge of the roof.

A further aspect combinable with any of the previous aspects further includes a main control system and a plurality of sub-control systems.

In a further aspect combinable with any of the previous aspects, one of the sub-control systems includes a lighting control system configured to control one or more lights mounted in the modular shelter.

In a further aspect combinable with any of the previous aspects, one of the sub-control systems includes a display control system configured to control a digital display mounted on an exterior surface of the unibody shell.

In a further aspect combinable with any of the previous aspects, one of the sub-control systems includes a security control system configured to control access into the indoor human-occupiable environment.

In a further aspect combinable with any of the previous aspects, the security control system includes at least one of a door locking mechanism, a key card reader, a keypad, and/or a biometric sensor.

In a further aspect combinable with any of the previous aspects, the main control system is configured to wirelessly communicate to a remote computing system.

In a further aspect combinable with any of the previous aspects, at least one of the plurality of sub-control systems is configured to provide life safety monitoring of one or more occupants of the indoor human-occupiable environment and communicate a life safety status to the main control system.

In a further aspect combinable with any of the previous aspects, at least one of the plurality of sub-control systems is configured to monitor a configuration of the modular shelter and communicate a configuration status to the main control system.

In a further aspect combinable with any of the previous aspects, the configuration status includes a door configuration status, a furniture configuration status, a model number, and/or a serial number.

In a further aspect combinable with any of the previous aspects, at least one of the plurality of sub-control systems is configured to communicate with a mobile device or other computing device to adjust a security status of the modular shelter.

In a further aspect combinable with any of the previous aspects, at least one of the plurality of sub-control systems is configured to communicate the security status to the main control system.

In a further aspect combinable with any of the previous aspects, the adjustment to the security status includes unlocking or locking a door of the modular shelter.

A further aspect combinable with any of the previous aspects further includes a main controller positionable to generate a mesh network to communicate with a plurality of modular shelters through the mesh network.

In a further aspect combinable with any of the previous aspects, the main controller is configured to wirelessly communicate data through the mesh network to a remote monitoring system.

In a further aspect combinable with any of the previous aspects, the data is associated with one or more of the plurality of modular shelters.

In a further aspect combinable with any of the previous aspects, the data includes at least one of position data, status data, message data, location data, orientation data, occupancy data, and/or configuration data.

In a further aspect combinable with any of the previous aspects, status data includes a description of health of a particular modular shelter or an occupant of a particular modular shelter.

In a further aspect combinable with any of the previous aspects, message data includes a description of a message shown on an exterior surface of a particular modular shelter.

In a further aspect combinable with any of the previous aspects, location data includes a GPS location of a particular modular shelter.

In a further aspect combinable with any of the previous aspects, orientation data includes a compass direction in which a front side of a particular modular shelter is facing.

In a further aspect combinable with any of the previous aspects, occupancy data includes a value of a number of occupants within a particular modular shelter.

In a further aspect combinable with any of the previous aspects, configuration data includes a description or version of a particular modular shelter.

In a further aspect combinable with any of the previous aspects, the remote monitoring system and the main control system include microprocessor based computing systems such as servers, laptops, desktops, tablets, smart phones or other computing systems.

In a further aspect combinable with any of the previous aspects, the main control system is configured to communicate data to a remote data storage device for subsequent retrieval by the main control system or remote monitoring system.

In a further aspect combinable with any of the previous aspects, respective unibody shells of the plurality of modular shelters are nestable, and respective bases of the plurality of modular shelters are stackable.

In another general implementation, a monitoring system for a community of mobile shelters includes data transmitters, each of which is positionable on or near a respective mobile shelter in the community of mobile shelters, each data transmitter configured to gather or receive data associated with the respective mobile shelter; and a portable computing system configured to generate a data network to communicably couple data transmitters and transmit data retrieved from the data transmitters to a remotely located computing system.

In a further aspect combinable with any of the previous aspects, the data associated with the respective mobile shelter includes any one of position data, status data, message data, location data, orientation data, occupancy data, and/or configuration data.

In another general implementation, a modular shelter includes a base; and a unibody shell coupled to the base, the unibody shell formed to include a roof and at least one side to define an indoor human-occupiable environment substantially enclosed within the base and the unibody shell, wherein the indoor human-occupiable environment is sized to receive a portion of another modular shelter therein.

In an aspect combinable with the general implementation, the side of the unibody shell is angularly directed inward from the base to the roof to facilitate receipt of the other modular shelter into the indoor human-occupiable environment.

A further aspect combinable with any of the previous aspects further includes a furniture member coupled to an interior surface of the unibody shell and adjustable between a deployed position and a stored position, wherein the furniture member is restrained against the interior surface in the stored position.

In a further aspect combinable with any of the previous aspects, the furniture member is restrained within a recess of the interior surface of the unibody shell in the stored position.

In a further aspect combinable with any of the previous aspects, the other modular shelter is receivable into the indoor human-occupiable environment of the modular shelter when the furniture member is in the stored position.

In another general implementation, a method for deploying a plurality of modular shelters includes receiving a plurality of shells of respective modular shelters, a first shells nested within a volume of a second shell, each of the first and second shells including respective furniture members installed to the shells in a stored position; removing the first shell from within the second shell; and adjusting the furniture member of the second shell from the stored position to a deployed position such that the furniture member extends into the volume of the second shell.

A further aspect combinable with any of the previous aspects further includes setting the first shell on a first base to form a first modular shelter; setting the second shell on a second base to form a second modular shelter; and connecting the respective shells to the respective bases.

A further aspect combinable with any of the previous aspects further includes adjusting the furniture member of the first shell from the stored position to a deployed position such that the furniture member extends into a volume of the first shell.

A further aspect combinable with any of the previous aspects further includes unstacking the first base from the second base prior to connecting the respective shells to the respective bases.

A further aspect combinable with any of the previous aspects further includes connecting electrical power to at least one of the first or second shells.

The details of one or more implementations are set forth in the accompanying drawings and the description below. Other features, objects, and advantages will be apparent from the description and drawings, and from the claims.

DESCRIPTION OF DRAWINGS

FIGS. 1A-1E illustrate various view of an example implementation of a modular shelter. FIG. 1A illustrates an isometric view, FIG. 1B illustrates a front view, FIG. 1C illustrates a back view, FIG. 1D illustrates a side view, and FIG. 1E illustrates a top view.

FIGS. 3A-3B illustrate cross-section view of a modular shelter and interior thereof, including one or more furniture members illustrated in deployed and stored positions, respectively.

DETAILED DESCRIPTION

This disclosure describes example implementations of a modular shelter, a modular shelter system and network, and computer-implemented methods of controlling, operating, and/or monitoring modular shelter systems. In example embodiments, a modular shelter may include a base that is secured (e.g., impermanently) to a shell (e.g., unibody shell) that comprises a single, or only a few, integral portions) that includes walls and a roof. For example, in some aspects, a unibody shell is comprised of a single layer to form a shell of the shelter that can mate with a base. In some aspects, the layer may include one or more skin surfaces attached to, or integrally formed with, a structural fill member, such as a honeycomb, fluted, solid core, porous core, or other structure, to provide shell rigidity, insulative characteristics, and structural strength. In some aspects, the shell may be formed to shed rain, snow, or other moisture, and, in combination with the base, to withstand wind shear and prevent (all or partially) tipping, and/or overturning due to wind shear and other external forces. A modular shelter system may include multiple modular shelters arranged in an organized environment or network. In some aspects, each modular shelter within the modular shelter system may be communicably coupled (e.g., wirelessly) to one or more other modular shelters through a network (e.g., LAN or mesh network). In some aspects, each modular shelter within the modular shelter system that is connected to the LAN or mesh network may be communicably coupled, e.g., through a cloud-based network, to one or more remote computing systems. The network may also be communicably coupled to the one or more remote computing systems (e.g., desktop, server, laptop, tablet, smartphone, cell phone, or otherwise) to monitor and/or control various aspects of the modular shelter system.

Figure 1B:
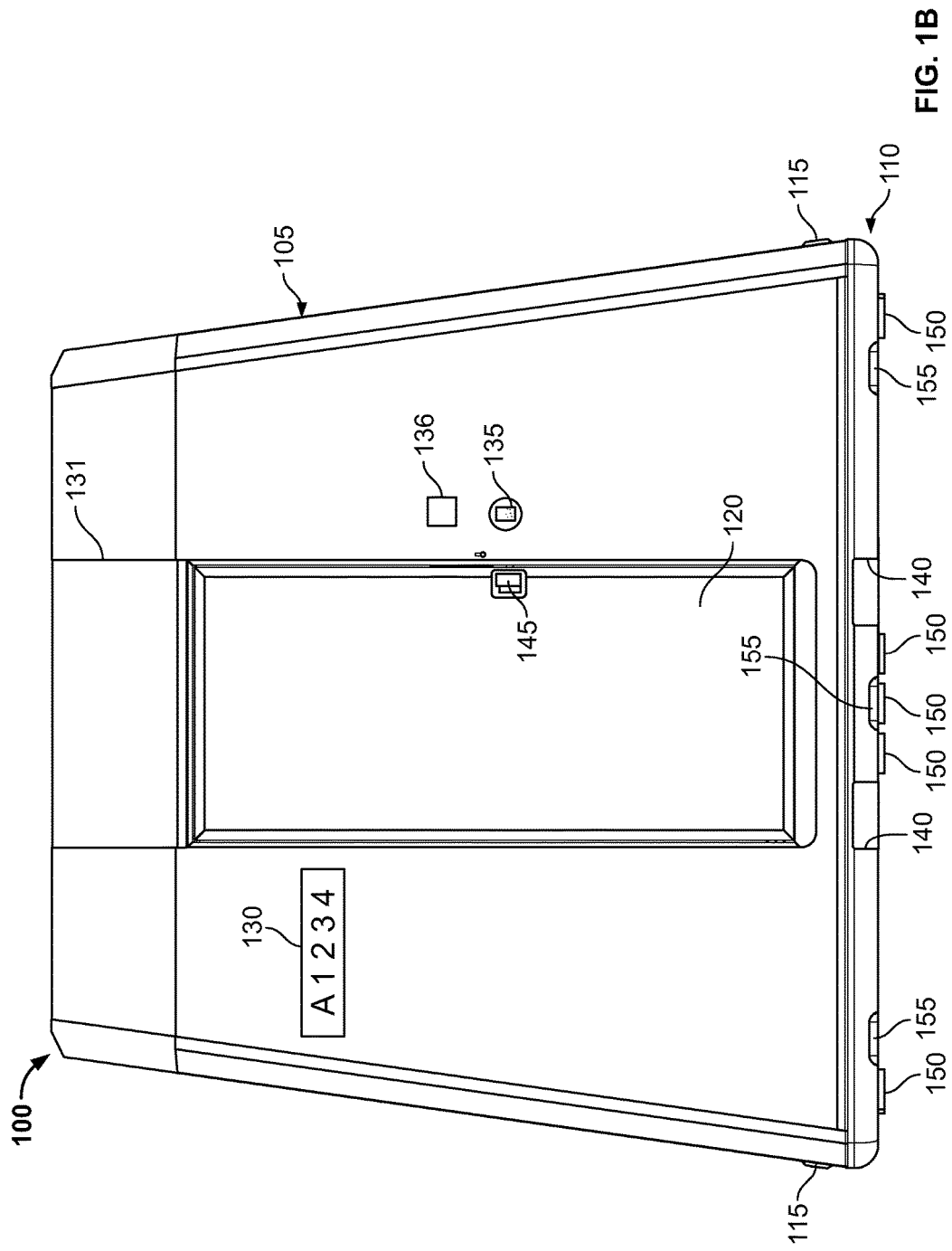
Figure 1C:
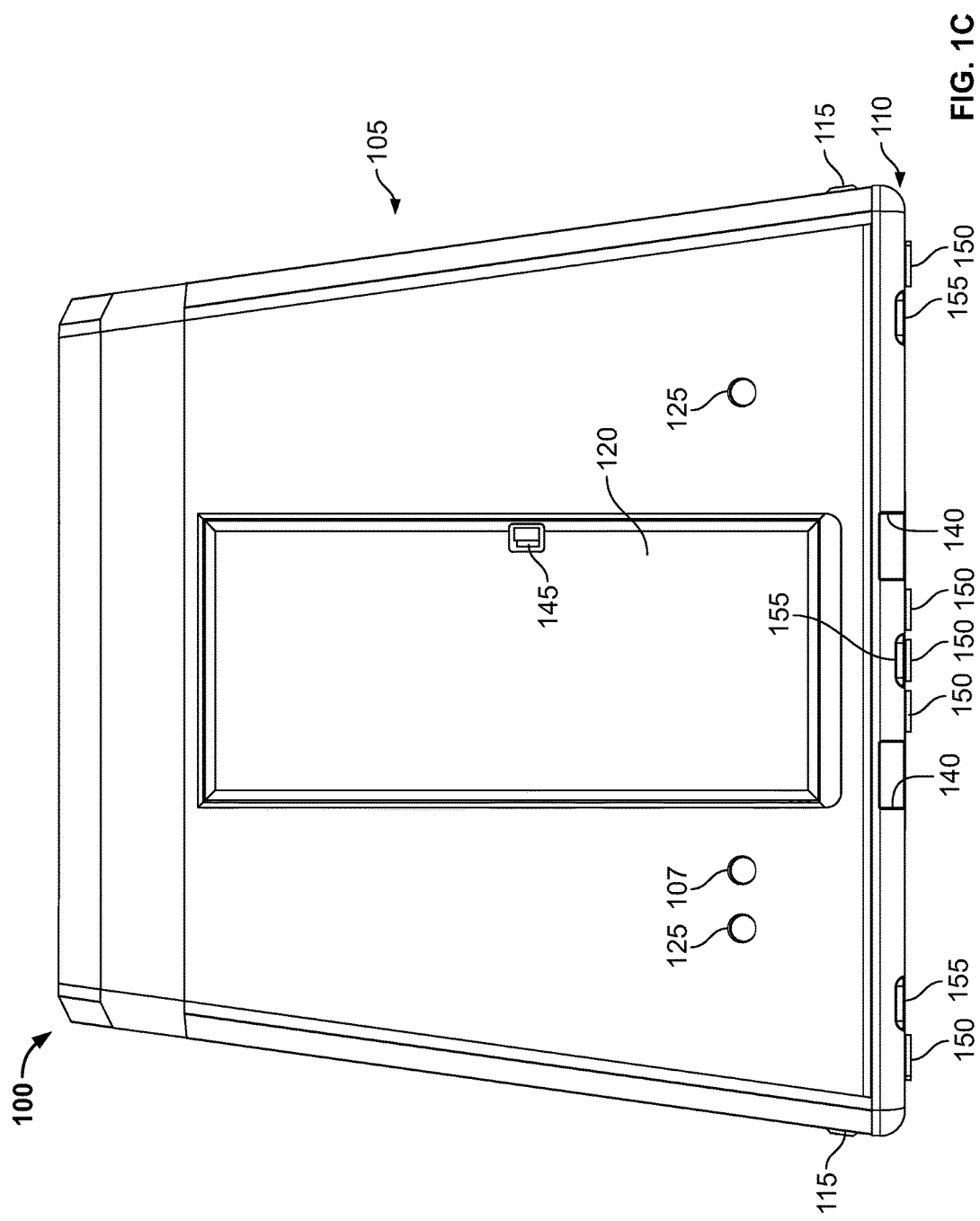
Figure 1D:
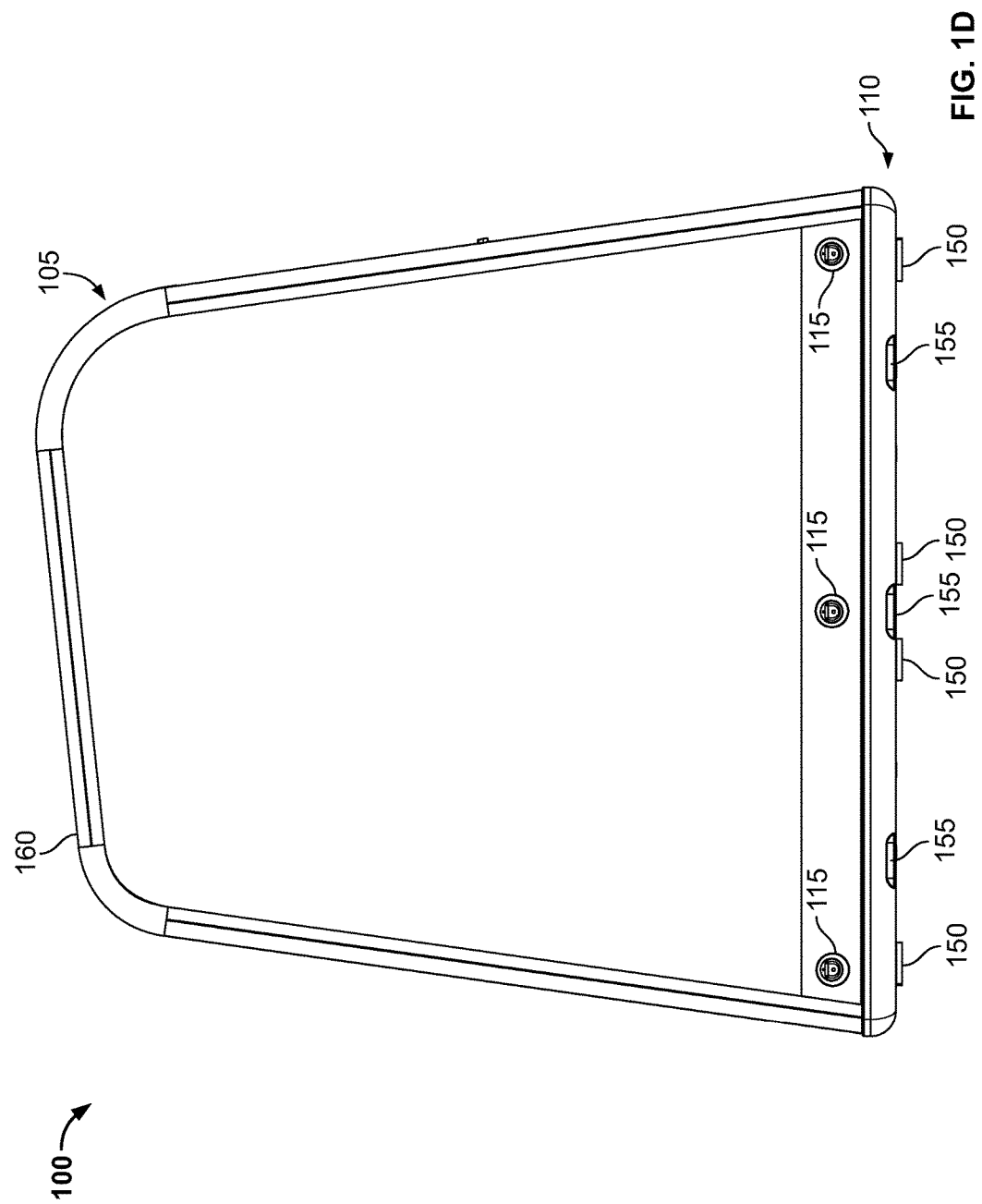
Figure 1E:
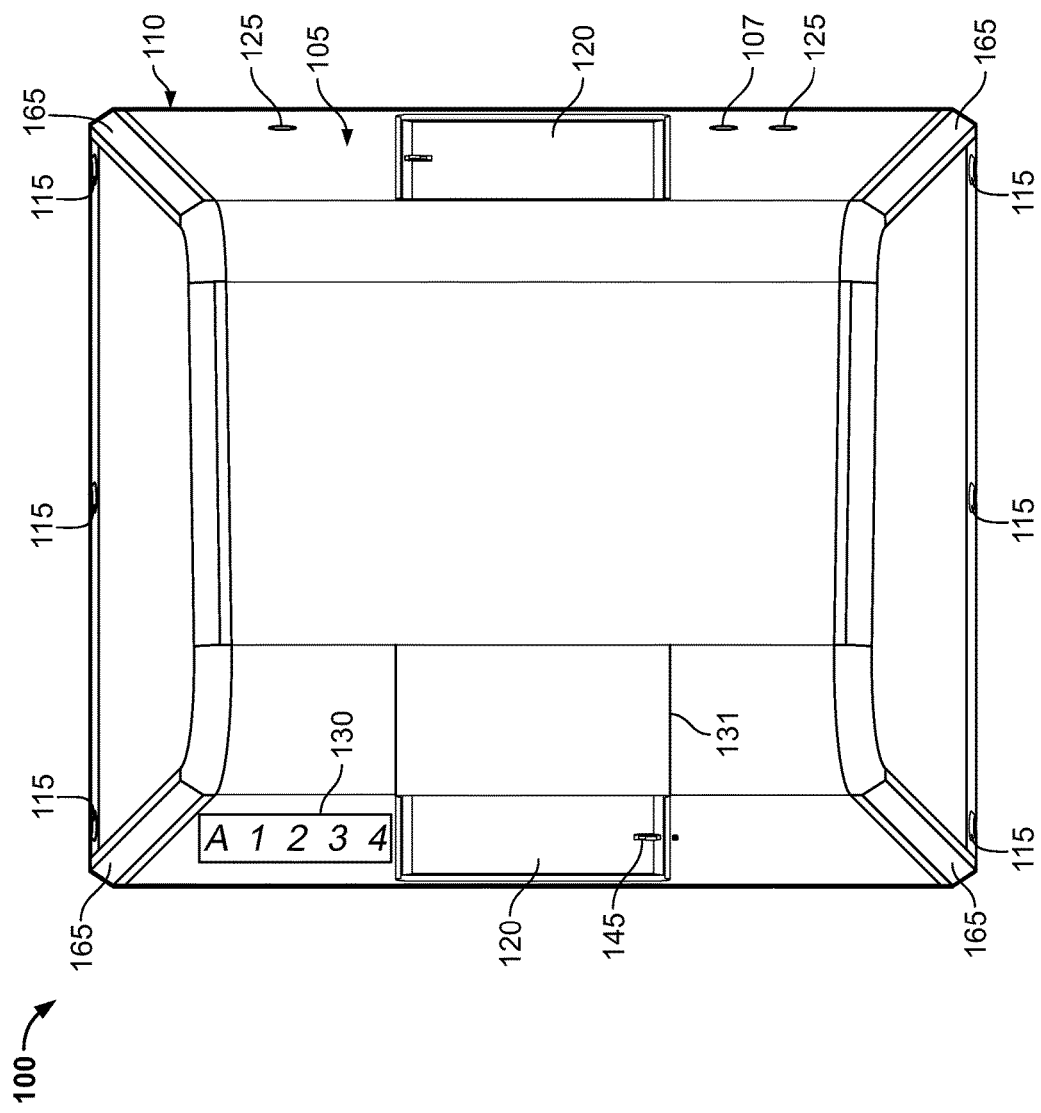

FIGS. 1A-1E illustrate various view of an example implementation of a modular shelter 100. FIG. 1A illustrates an isometric view, FIG. 1B illustrates a front view, FIG. 1C illustrates a back view, FIG. 1D illustrates a side view, and FIG. 1E illustrates a top view. Modular shelter 100 includes a shell 105 and a base 110 that can be coupled together to form an indoor, human-occupiable environment that is accessible by one or more doors 120 mounted in the shell 105. The shell 105, in some aspects, may be a unibody structure that is formed with one or more skin surfaces (e.g., sheets of flexible, rigid, or semi-rigid material) attached to a structural core (e.g., honeycomb, fluted, solid core, porous core, or other structure) of, for example, a composite material using a recyclable matrix combined with glass fibers or other material. In some aspects, the structural core is covered on both sides (e.g., interior and exterior of the shell 105) with the skin surfaces. The shell 105, therefore, may provide a stand-alone structure that provides insulative properties for occupants of the shelter 100.

Figure 2:
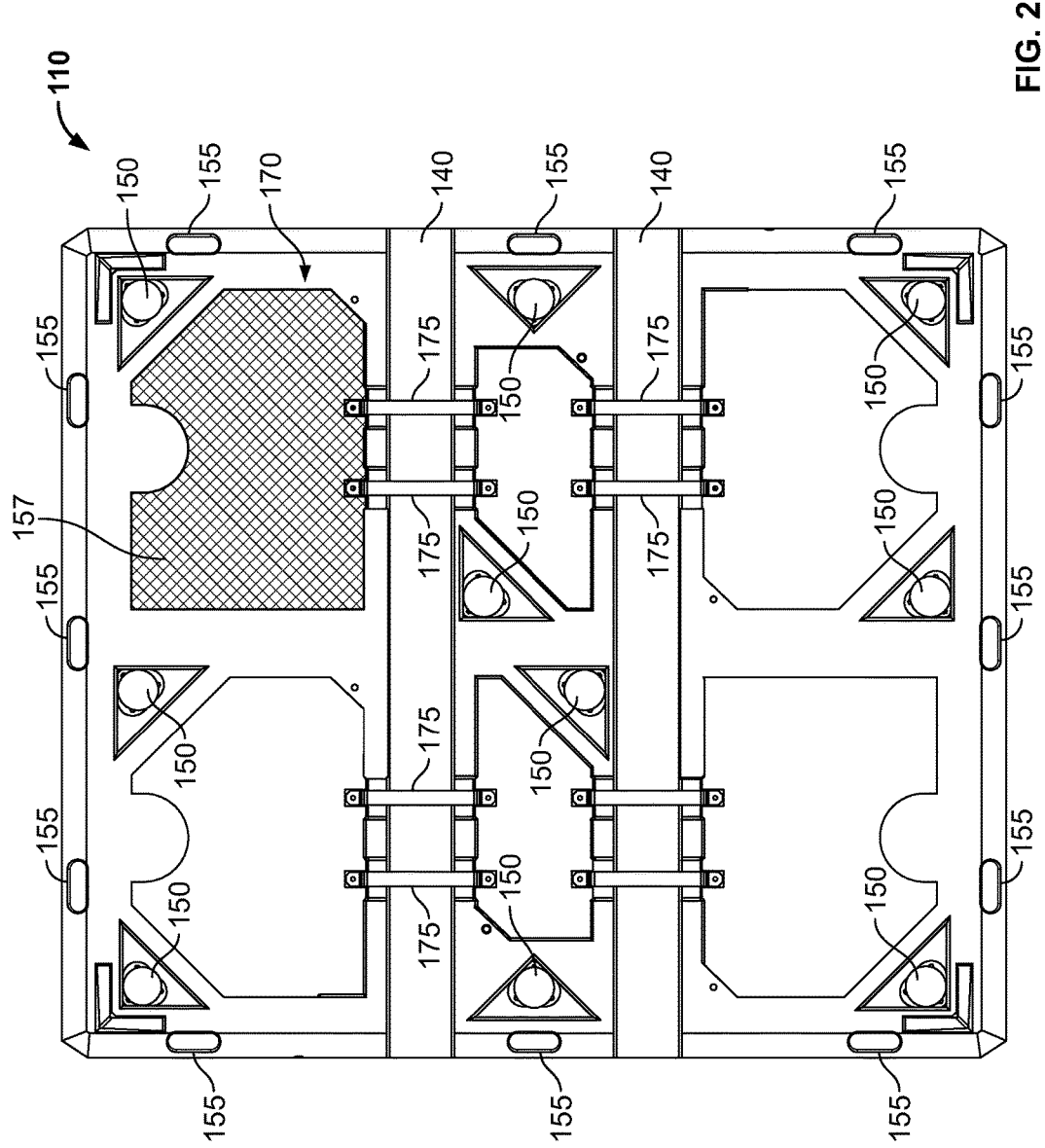
FIG. 2 illustrates an example implementation of a base (shown in a bottom view) of a modular shelter.

As shown in FIG. 2, a bottom view of the base 110 is illustrated. The base 110, in this example, includes a web structure 170 that may be fillable (e.g., with water, sand, or other material) to increase the weight of the base 110. For example, the web structure 170 may be emptied of any material in order to move or transport the base 110, but may be filled once the base 110 is at a particular location (e.g., and attached to the shell 105) to increase stability of the shelter 100. For instance, with a filled or partially filled web structure 170, the weight of the modular shelter 100 may be sufficient to prevent or decrease overturning of the shelter 100 (e.g., due to wind or other forces).

The base 110 also includes slots 140 that extend between sides of the base 110 and provide channels through which forks, e.g., of a forklift, may be inserted to move or lift the base 110 and/or complete modular shelter 100. Straps 175 are illustrated as extending across the slots 140 near a middle portion of the web structure 170. The straps 175 may hold or help hold the base 110 and/or modular shelter 100 onto the forks during movement and/or lifting.

The base 110, as illustrated in this example, include one or more hand lifts 155 arranged along one or more sides of a perimeter of the base 110. The hand lifts 155 may provide locations to which the base 110 may be held so that one or more persons can move and/or lift the base 110. For example, in some implementations, the base 110 may be moved into place (e.g., a particular set location on level or semi-level ground) by one or more persons using the hand lifts 155. Once in place, the web structure 170 may be filled (e.g., with water, sand or other material) as described above.

Figure 3A:
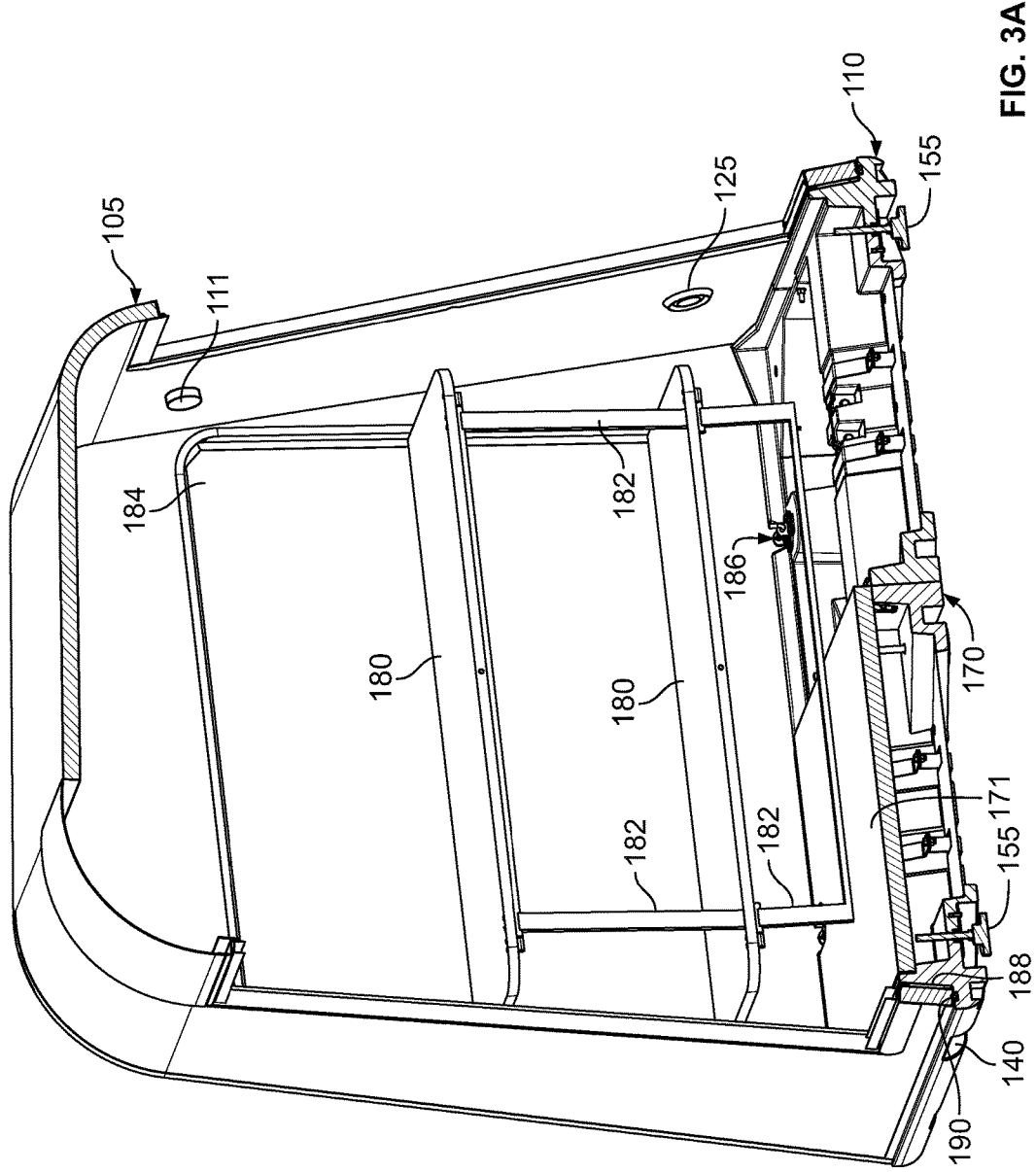

The example base 110 also includes one or more levelers 150 (also shown in FIGS. 3A-3B). The levelers 150, in this example, comprise a foot member attached to a threaded rod that may be adjusted (e.g., vertically) to adjust a height of the base 110. For example, each of the illustrated levelers 150 may be individually adjusted so that the base 110 (and modular shelter 100) is level or substantially level when placed on uneven ground or an unleveled surface.

The example base 110 also includes one or more screens 157 that are installed in the base 110 to cover void areas of the web structure 170. Although one screen 157 is shown in FIG. 2, each void area may include a screen 157. In some aspects, the screens 157 may cover and/or shield void areas that contain and/or enclose plumbing components, such as fluid-storing tanks, fluid carrying conduits, valves, and other plumbing fixtures. In some aspects, the screens 157 may cover and/or shield void areas that contain and/or enclose electrical or plumbing components. The example screen 157, for instance, may be a plastic, an aluminum or other metal screen that is attached to the web structure 170 or other portion of the base 110.

Turning back to FIGS. 1A-1E, the example modular shelter 100 includes one or more lifting lugs 115 attached to, or integral with, the shelter 100 (e.g., the shell 105 and/or the base 110). Although shown as positioned near the base 110 and along a side of the shell 105, the lifting lugs 115 may be placed in any appropriate location to facilitate lifting of the modular shelter 100 (e.g., by a crane, forklift, manually by hand, or otherwise). Generally, each lifting lug 115 includes a pivotable or rotatable ring member through which a cord or other rope or strap may be passed and/or connected. In some aspects, as shown in the example implementation, two sides of the shell 105 may include multiple, evenly spaced lifting lugs 115 to facilitate an even and/or level lift of the modular shelter 100.

The example shelter 100 also includes one or more vents 125. The vents 125 may be used to induce or generate an airflow through the indoor human-occupiable environment of the shelter 100. In some aspects, multiple, adjustable vents 125 may be included on the shell 105. Further, in some aspects, powered air conditioning modules may be included as part of or external to the shelter 100 to control, e.g., ambient temperature, humidity, and other environmental factors, within the shelter 100.

The modular shelter 100, as shown, includes a power input 107 so that electrical power may be provided to the shelter. For example, in some aspects, residential outlet power (e.g., 120/1/60) may be provided to power, for example lights (e.g., lights 111 shown in FIG. 3A), control modules (e.g., for security, displays, and otherwise), and other powered features that are not shown (e.g., outlets, air conditioning modules, heaters, and otherwise). The power input 107 may also include one or more power transformers to step down (or step up) power received at the input 107 to power that is usable by one or more components of the modular shelter 100. As one example, the power transformers may step down 120V power to 12V power, e.g., for control module usage.

As one example of a powered feature, a display 130 (e.g., alphanumeric display) may be mounted on an exterior of the shell 105 or within the skylight 131. As shown, the display 130 is mounted near the front door 120 (located to the side of the door 120 but may be located other places, such as above the front door 120) and may be used by an occupant or an administrator (e.g., of a community of modular shelters 100) to display any number of messages. For example, the display 130 can be adjustably programmed to display an identifier of the shelter 100, a location (e.g., GPS, street address, room number, or otherwise) of the shelter 100, an occupant name, an occupancy status (e.g., vacant or in use), a shelter status (e.g., usable or not usable), and/or an occupant emergency status (e.g., an external display of an emergency situation in the indoor environment). Other messages may also be programmed into the display 130 by an occupant or other user. The display may also be used as accent lighting or, in some circumstances, as a way to identify a particular modular shelter by illuminating it in a certain color.

In the illustrated example of the modular shelter 100, doors 120 are located on a front side (shown in FIGS. 1A and 1B) and a back side (shown in FIG. 1C) of the modular shelter 100. Each door 120 may include a lockable latch 145 to secure items and/or occupants within the indoor environment of the shelter 100. In some aspects, the lockable latch 145 may be locked/unlocked with or with the help of a security control module 135 that, in this example, is shown mounted through the shell 105 near the front door 120. In some aspects, the security control module 135 may be one of several control modules (e.g., controllers, PCB control modules, or other processor or non-processor based control system) that are part of the modular shelter 100. The security control module 135 may include, for example, a keypad, NFC reader, biometric sensor, voice reader, and/or other form of identification device that is communicably coupled to operate the latch 145 based on a user's input. Each door 120 may include a security control module 135 or a single security control module 135 may control access to multiple doors 120.

In some aspects, one or more of the doors 120 may be interchangeable to provide for multiple door options. For example, the door 120 may be a conventional swinging (e.g., outwardly) door. Another type of door (e.g., sliding, roll-up, double, screen, etc.) may also be installable in the same doorframe of the shell 105 as the door 120 with minimal or no change to the structure of the shell 105 (or door frame). Moreover, in some aspects, one or more sensors (e.g., magnetic or otherwise) may be mounted in the door frame and/or shell 105 that automatically determine a type of door installed in the shelter 100. This determination may be made or communicated to a main control module 136 as described below.

In this example implementation of the modular shelter 100, a skylight 131 is mounted in the shell 105, e.g., above the door 120. The skylight 131, in some aspects, may facilitate an entry of natural light into the modular shelter 100, thereby reducing electrical usage (e.g., for lights 111). In some aspects, the display 130 may be mounted underneath the skylight 131 to allow the display to be seen from greater distances.

In some aspects, the modular shelter 100 may include, along with the security control module 135, a main control module 136 (shown schematically in FIG. 1A on the shelter 100), and a display control module. The main control module 136 may communicate (e.g., wirelessly) with controllers or systems external to the modular shelter 100, such as described with reference to FIG. 5, and may also coordinate the other control modules' activities. Each of the control modules may be a processor-based controller, such as a PCB controller, or otherwise. The main control module 136, in some examples, can determine the location of a modular shelter 100 via GPS and other sensor types. The main control module 136 can monitor the interior of the modular shelter 100 for events that may be harmful to inhabitants of the structure such as fire, smoke, noxious fumes, biological or radiology threats. For example, the main control module 136 may be connected (e.g., wired or wireless) to a smoke detector, carbon monoxide detector, or other hazardous fume detector. The main control module 136 can deliver audible messages and alerts to inhabitants (e.g., fire or alarm messages). Main control module 136 can monitor the shelter's orientation to determine if there has been a change (e.g., tipped or blown over and/or its facing direction). The main control module 136 may also control interior lighting allowing for dimming and possible color selection by users.

FIGS. 3A-3B illustrate cross-section view of the modular shelter 100 and interior thereof, including one or more furniture members illustrated in deployed and stored positions, respectively. For example, FIG. 3A shows a cross-sectional view of the modular shelter 100 with a furniture member, here a bed 180, in a deployed or down position. In this example, the shelter 100 includes bunk beds (e.g., four total) with four beds 180 (two are shown in these figures) each supported by a bed support 182. Here, the bed frame 180 is hingedly connected to the bed support 182. Thus, the beds 180 may be adjusted (e.g., raised) to a stored position as shown in FIG. 3B. Here, the beds 180 (and, in some aspects, a mattress) may be lifted and stored in a recess 184 of the shell 105 (or, in some aspects, simply against an interior wall of the shell 105). In some aspects, when the bed 180 and supports 182 are in the stored position, the indoor environment of the modular shelter 100 may be used to receive another modular shelter 100 or a part of another modular shelter 100 (e.g., all or a portion of a shell of another modular shelter 100). In such aspects, multiple modular shelters 100 (e.g., or shells 105) may be nested together for transportation and/or storage (as explained more fully with reference to FIG. 4).

FIG. 3A also shows an example connection system between the base 110 and the shell 105. For example, as shown here, the base 110 includes a ledge 188 that extends around a perimeter of the base 110. The ledge 188 provides a seat on which the shell 105 may rest (e.g., with a seal or gasket 190 between the base 110 and the shell 105). One or more connectors 186 (e.g., spring-loaded connectors) may then engage the shell 105 to the base 110 to form the shelter 100. A floor 171, that may be part of the shell 105 or separate from the base 110 and the shell 105, may be placed over the web structure 170 of the base 110 once the shell 105 and the base 110 are connected.

Figure 4:
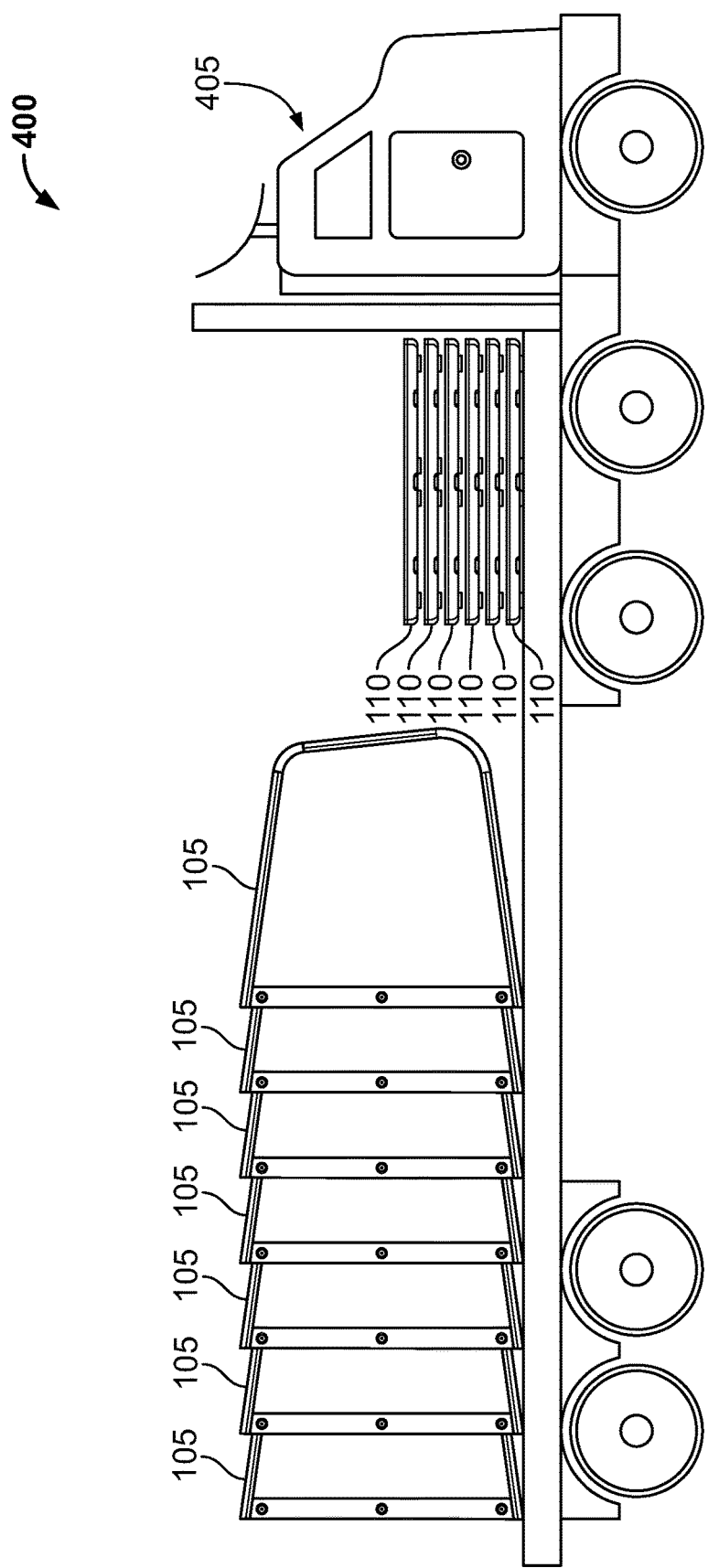
FIG. 4 illustrates an example transportation system for moving multiple modular shelters.

FIG. 4 illustrates an example transportation system 400 (e.g., tractor trailer, but also may be a train, boat, plane, or otherwise) for moving multiple modular shelters 100. As described briefly above, multiple shells 105 may be nested, as shown in this figure, for transportation and/or storage. In some aspects, the shell 105 is designed (e.g., with its shape, size, corners, etc.) so that another shell 105 may be fully or partially inserted so that multiple shells 105 may nest together. As described above, internal features of the modular shelter 100, such as furniture members, lights, doors, and otherwise, may remain installed into the shells 105 even during nesting to make re-assembly (e.g., after transportation and/or storage) quicker and more efficient. In addition, in some aspects, the angular design of edges or corners of the shelter 100 (e.g., where sides of the shelter join with the front, top, and back) may help or facilitate nesting of multiple shells 105. For instance, an angle of the front side of the shell 105 as it extends from the base 110 to the top of the shelter 100 of between about 5 and about 10 degrees, and preferably about 8 degrees (e.g., from vertical) may facilitate nesting of the shells 105. Further, as shown, the bases 110 of multiple modular shelters 100 may be stacked on the same transport (e.g., truck 405 shown as an example transport) and/or stored to reduce space usage. Although shown with the bases 110 stacked in front of the shells 105, the bases 110 may be stacked behind the shells 105 as well.

For example, multiple complete modular shelter 100 may be stored, transported, and then constructed with minimal time and effort due to, for example, the nesting features as well as the deployable and storable furniture members. The shells 105 shown in FIG. 4 may include all furniture members (e.g., the bunk beds or other furniture members such as tables and otherwise) in their respective stored positions. Once the bases 110 are set in their respective positions, the shells 105 may be lifted and set upon the bases 110 and connected as described above. Then, the furniture members in each shell 105 may be adjusted to their respective deployed positions, power may be connected, and other control systems of the shelters 100 may be initiated. Once the modular shelters 100 have been used, the furniture members may be adjusted back to their respective stored positions, power disconnected, and control systems may be de-energized. Then, the shells 105 may be disconnected from the bases 110 and stacked or nested (e.g., with the furniture members still installed in the shells 105 in their stored positions) for transportation and/or storage. Next, the bases 110 may be stacked for transportation and/or storage.

In further example implementations, the furniture members may also include plumbing fixtures, such as a toilet, sink, or otherwise. In some aspects, for instance, plumbing conduit (e.g., PVC, copper conduit, cross-linked polyethylene, or other conduit) may be installed into the base 110 (e.g., prior to or after assembly of the base 110 and shell 105). For example, conduit may be routed in the web structure 170 and up through the floor 171, out through the shell 105, or out through a side of the base 110, as needed. The conduit(s) can be used for potable water, a sanitary sewer, venting, or otherwise. The conduit(s) may also have connections (e.g., for potable water, sewer, or otherwise) at an exterior of the shelter 100. For example, a potable water connection may be made (e.g., once the shelter 100 is assembled at a remote location) to the conduit, which is connected within the shelter 100 to a sink. As another example, a sewer or septic tank connection may be made (e.g., once the shelter 100 is assembled at a remote location) to the conduit, which is connected within the shelter 100 to a toilet.

Figure 5:
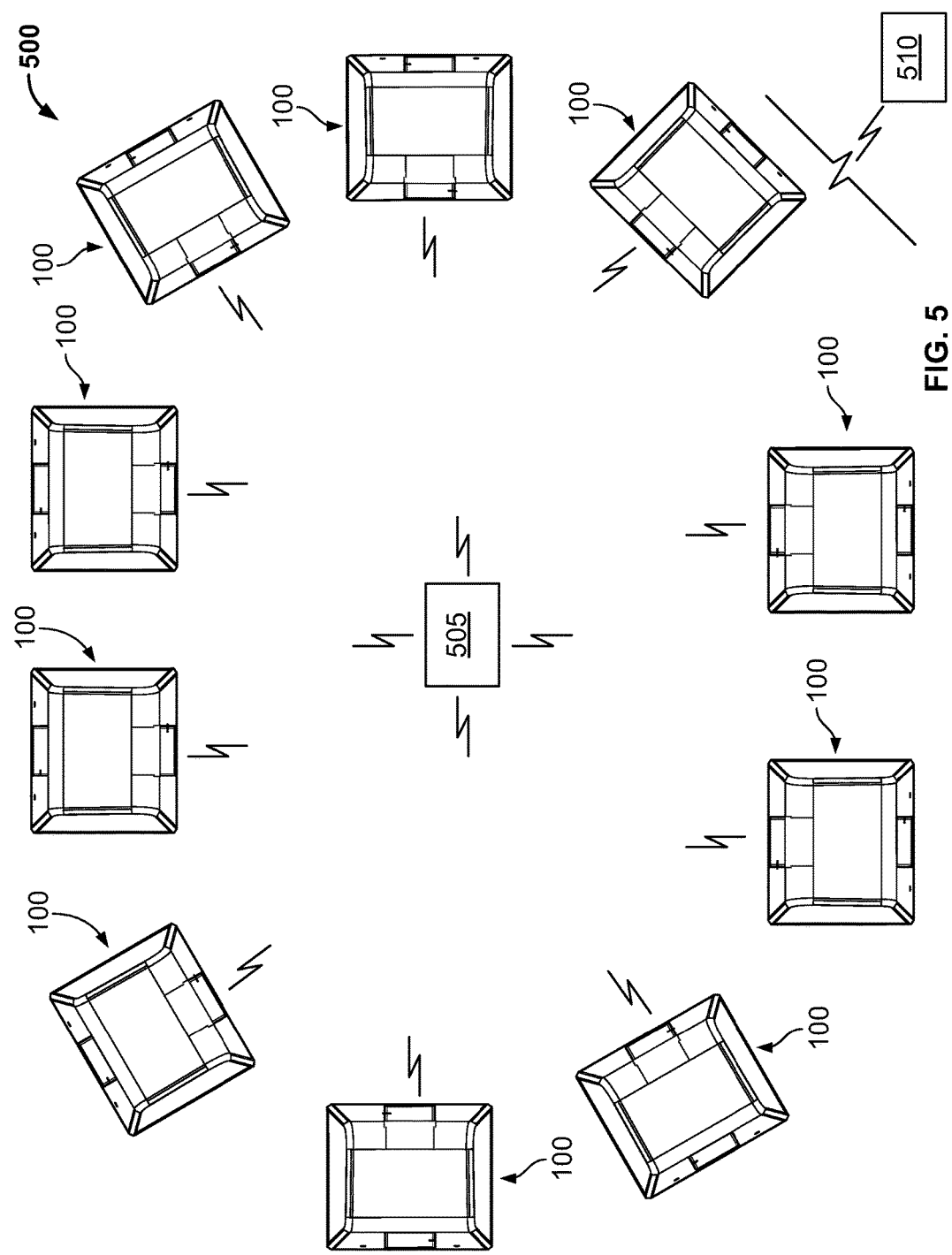
FIG. 5 illustrates an example modular shelter system.

FIG. 5 illustrates an example modular shelter system 500. In this example, the modular shelter system 500 includes multiple modular shelters 100 arranged in a community of shelters 100 and communicably coupled to a network bridge 505. In one example, once the modular shelters 100 are deployed, each is connected to a wireless mesh network (or other communication network) generated by the network bridge 505. For example, a main control module 136 of each modular shelter 100 may wireless communicate with the network bridge 505 to provide data and in some examples, data uniquely associated with a particular shelter 100 within the system 500. In other examples, the main control system 505 may be part of the main control module 136 of a particular shelter 100, thereby being arranged in a master-slave arrangement where one of the shelters 100 includes the master controller that, e.g., generates the mesh network.

The main control system 505 may wireless communicate with a remote computing system 510 (shown here "remotely" from the community of shelters 100). In some examples, the remote computing system 510 may be miles, hundreds of miles, or even thousands of miles away from the network bridge 505 (and the community of shelters 100). In some examples, each of the modular shelter 100 within the system 500 may individually communicate with the remote computing system 510 and the network bridge 505 may not be present. Further, the remote computing system 510 may represent a computer (or number of computers) that is communicably coupled to the system 500 through the Internet but is not affiliated with the system 500 of modular shelters 100.

Moreover, although modular shelters 100 are shown in system 500, other forms of temporary or semi-temporary housing (e.g., tents, trailers, RVs, vehicles, and otherwise) may be used in combination with the network bridge 505 and main control modules 136 as described above. For example, main control modules 136 that are operable to communicate with the main controller 136 may be positioned at or near the temporary or semi-temporary shelters while the network bridge 505 may be positioned to communicate with the main control modules 136. Thus, any grouping or community of temporary or semi-temporary shelters may include the functionality as described below (as examples) with reference to a community of modular shelters 100.

The network bridge 505 may communicate to send/receive data to the shelters 100. In some examples, the data may include data specific to a particular shelter 100 in the system, data specific to the system 500 (e.g., associated with all of the shelters 100 in the system 500), or other data (e.g., data from outside of or unassociated with the system 500, such as news, weather, and otherwise). To that end, such data may be communicated for display at the remote computing system 510, other computing systems (such as smart phones, cell phones, remote servers, etc.), and the network bridge 505, itself. In some aspects, such data may be displayed, e.g., in a form such as GUI 600 shown in FIG. 6.

As illustrated in GUI 600, data associated with the system 500 and/or individual modular shelters 100 within the system can be presented (e.g., through a browser or other interface) to a user or administrator. As one example, a business enterprise may supply the modular shelters 100 to form the system 500 of shelters 100, along with the network bridge 505, in response to, e.g., a catastrophic event, musical festival or other enterprise, or other event. The administrator, or other user, may then view data communicated from the system 500 (e.g., from the network bridge 505) at the remote computing system 510 or other computing system.

Figure 6:
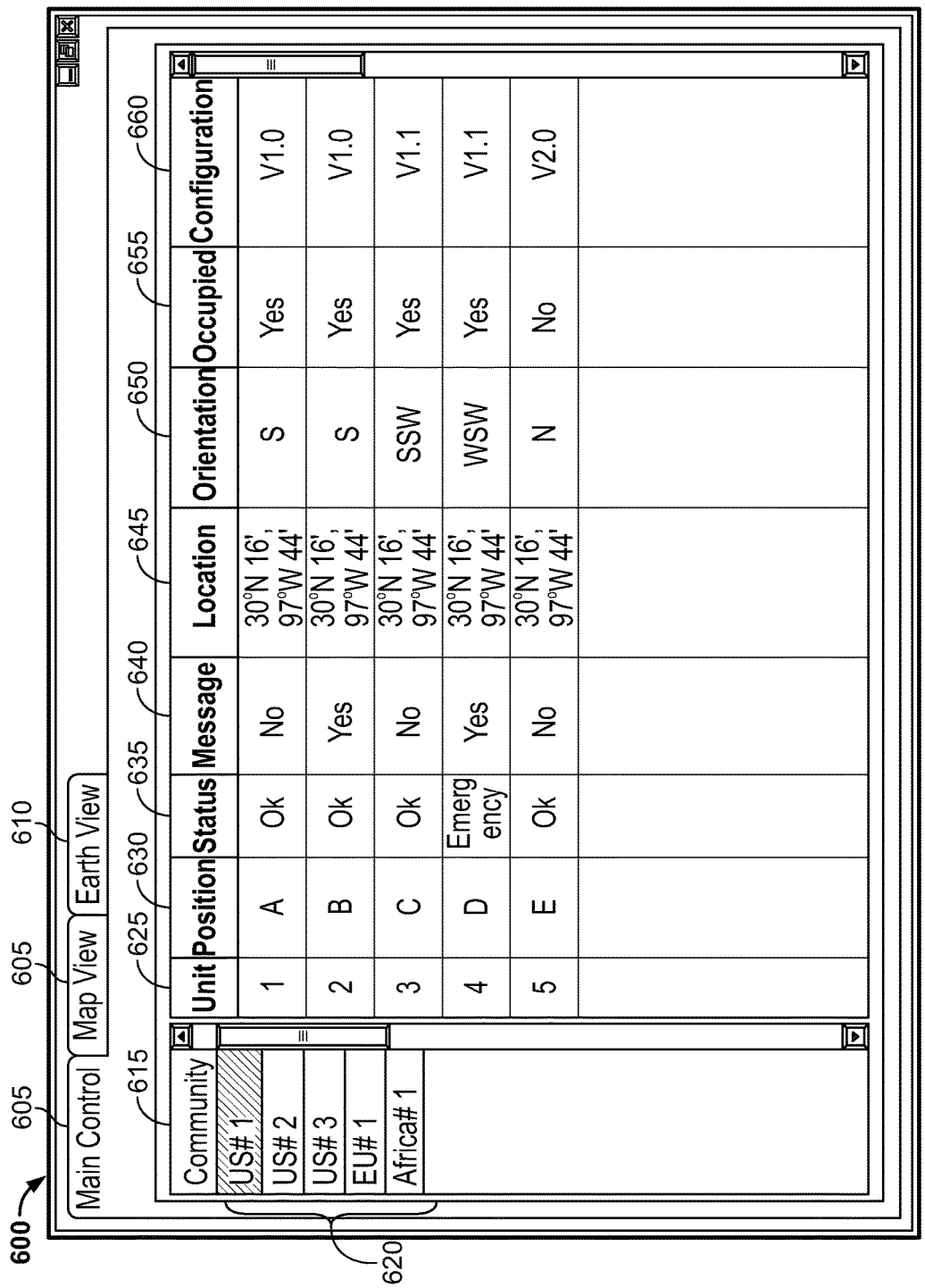
FIG. 6 illustrates a view of an example Graphical User Interface (GUI) that is part of a control system used to monitor, observe, and/or control a modular shelter system and network.

GUI 600 shows one example of an interface that presents data associated with the system 500 and/or individual shelters 100 within the system 500. As illustrated, the GUI 600 may include a main control tab 605, a map view tab 607, and an earth view tab 610. Of course, more tabs or fewer tabs may be included in other examples. The main control tab 605 is shown in FIG. 6.

In the main control tab 605, a community view 615 shows a number of modular shelter communities (e.g., groups of modular shelters 100) deployed for a particular purpose at a particular location. For example, at any particular moment, one or more groups of modular shelters may be deployed around the world at any particular time. As shown in this example, five different communities 620 are selectable in the community view 615. Each community 620 is named according to its general location (e.g., country) and order of deployment within that location, but other naming conventions are, of course, contemplated by the present disclosure.

As shown, a particular community 620 is selected and the data represented in the GUI 600 is associated with that particular community 620. The data includes, in this example, unit data 625. Here, there are five units, i.e., modular shelters, within the particular selected community. For each of the five units, data associated with the particular unit is shown in a row across from each unit. This data, in this example, includes position data 630, status data 635, message data 640, location data 645, orientation data 650, occupancy data 655, and configuration data 660.

Position data 630, in this example, includes a description of the position of the particular unit within the community 620. The position data 630 may allow an administrator or user to quickly locate the particular unit, for example, within a graphic on the map view tab 607, on a satellite image in the Earth view tab 610, and/or at the location of the community 620. Position data 630 may also contain other type of data formatting such as room numbers or street addressing.

Status data 635 may represent a status of the unit, itself, and/or of an occupant of the unit. For example, status data 635 of the unit may provide a description of whether all or part of the components of the modular shelter are functioning correctly. Status data 635 may also include a description of whether an occupant of the modular shelter is healthy, in need of medical attention, or otherwise.

Message data 640 may include, for example, data being displayed on the display 130. As another example, message data 640 may include a message specifically sent by an occupant of the unit, such as to request medical attention or otherwise. In some aspects, message data 640 may include a message sent to the particular unit from the administrator.

Location data 645, in this example, includes a description of a specific global location of the particular unit. For example, a GPS location device may be included with each modular shelter, which transmits (e.g., through the main control module and network bridge) the specific GPS location so that, for instance, the unit can be precisely found by first responders or other emergency personnel and displayed accurately from the map view 605 and earth view 610 tabs within the GUI 600 or via other remote computing systems or devices.

Orientation data 650 may include several types of data. For example, it may include a compass direction to which a front side of the modular shelter is currently facing. Thus, first responders and/or emergency personnel may be informed on where to enter a particular modular shelter. Orientation data 650 may also include, in some examples, a description of whether a particular modular shelter is overturned or right side up.

Occupancy data 655 may include, for instance, a description of whether or not a particular modular shelter is currently occupied (e.g., in real-time). Occupancy data 655 may also include a description of whether a particular unit, whether or not currently occupied, has an occupant assigned to it. In some examples, a specific number of assigned occupants of a particular unit is part of the occupancy data 655.

In another implementation, techniques for planning a community layout (e.g., of a community system 500) of modular shelters 100 given a map location and a certain quantity of units may include the following. The techniques may create virtual streets and avenues, assigning an address and location to each modular shelter 100 in the community 500. The street names and addresses may be created as closely as possible according to local customs and conventions. Once generated, a layout of the community 500 may be displayed in the GUI 600 and instructions generated to help workers position the shelter 100 in accordance with the layout. Instructions (e.g., encoded in software on, for example, a mobile device) may provide feedback to ensure that the shelter 100 are positioned correctly. Administrators may use the GUI 600 to adjust and customize the generated layouts, editing street names, and otherwise, as they see fit.

Other techniques for deriving a community 500, including planning of virtual streets, avenues, and addresses for a group of modular shelters 100 deployed at a particular location may include the following. For example, "street addresses" may be assigned to each shelter 100 and displayed via a display panel 130 of each shelter 100 after deployment at a particular location. As these shelters 100 have power applied, each shelter 100 may report its respective location using GPS and other sensor data back to the control system of GUI 600 via a network bridge 505. The GUI 600 may generate and display a map view based on the received sensor data. After the GUI 600 displays map view of a particular community 500, designations (e.g., alphanumeric or otherwise) may be assigned to each shelter 100 and communicated back to the community 500 (e.g., back to each respective shelter 100) via the network bridge 505. Each respective shelter 100 may display the assigned designation, e.g., on the display 130.

Configuration data 660, in this example, may include a version of the particular modular shelter. The version may indicate, for instance, a particular model of the modular shelter, as well as an indication of one or more components or features of the particular unit. This data 660 may, in some examples, show a modular units 100 serial number, model number, or other type of unique identifier.

Figure 7:
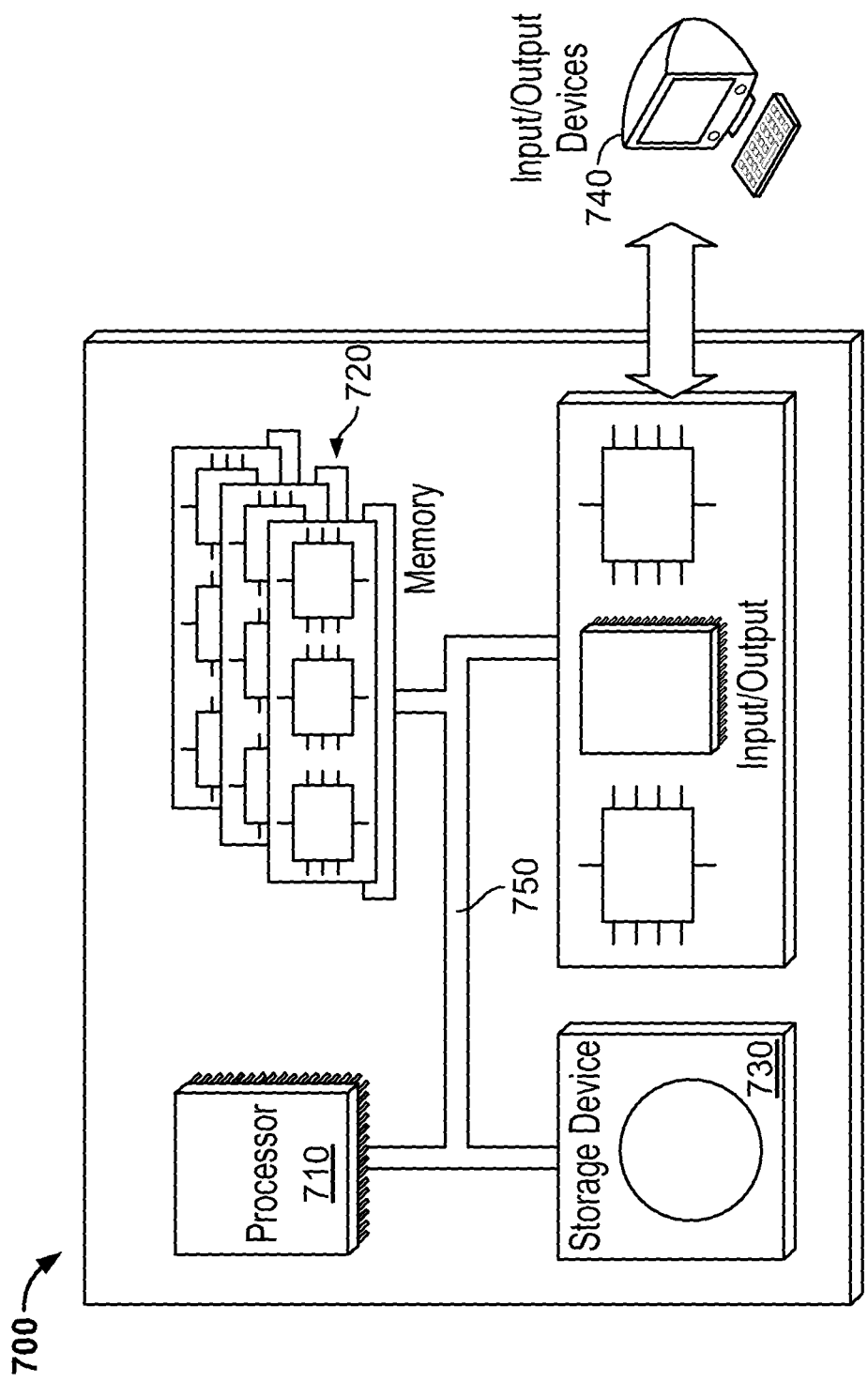
FIG. 7 is a schematic diagram of a computer system that can be used for the operations described in association with any of the computer-implemented methods described herein.

FIG. 7 is a schematic diagram of a control system (or controller) 700. The system 700 can be used for the operations described in association with any of the computer-implemented methods described previously, for example as or as part of the controllers of control systems 505 and/or 510 or other controllers described herein. For example, the system 700 may be used in providing local control for a system or network of modular shelters as shown in FIG. 5, remote control and/or monitoring of a system or network of modular shelters as shown in FIG. 5, control and/or monitoring of individual modular shelters (e.g., modular shelter 100), or otherwise.

The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. In some implementations, the control modules herein may not include a memory module 720.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A modular shelter, comprising:
    a base;
    a unibody shell coupled to the base, the shell formed to comprise a roof and at least one side to define an indoor human-occupiable environment substantially enclosed within the base and the shell, the unibody shell comprising a core structure sandwiched between an inner skin surface and an outer skin surface, the core structure comprising a honeycomb or fluted member, the unibody shell comprising at least one door opening;
    a ledge that extends along a perimeter of the base and comprises a mounting surface for the unibody shell;
    a gasket positioned on the mounting surface that at least partially seals an interface between the unibody shell and the base;
    one or more latches that secure the unibody shell to the base;
    a door mounted in the door opening; and
    one or more sensors mounted in the door opening or unibody shell that is configured to automatically determine a type of the door mounted in the door opening.

2. The modular shelter of claim 1, wherein the core structure comprises an insulation layer of the unibody shell.

3. The modular shelter of claim 1, wherein the roof and side are thermally fused together.

4. The modular shelter of claim 1, further comprising at least one of:
    a plurality of lifting lugs positioned on at least one of the unibody shell or the base; or
    a plurality of hand lift spaces formed on at least one of the unibody shell and/or the base.

5. The modular shelter of claim 1, wherein the base comprises a structural web member that comprises a Tillable volume.

6. The modular shelter of claim 5, wherein the structural web member comprises:
    a void area sized to contain or enclose one or more plumbing components or plumbing fixtures; and
    one or more screens that cover the void area.

7. The modular shelter of claim 1, wherein the base comprises a plurality of adjustable leveling legs configured to level the modular shelter on a surface.

8. The modular shelter of claim 1, further comprising a furniture member connected to the interior surface of the side, the furniture member moveable between a deployed position such that the furniture member extends into the indoor human-occupiable environment and a stored position in which the furniture member is positioned in a recess defined in the interior surface of the side.

9. The modular shelter of claim 8, wherein the furniture member comprises at least one of a bed, a desk, a table, a shelf, or a plumbing fixture.

10. The modular shelter of claim 1, wherein the indoor human-occupiable environment is sized to receive a portion of another modular shelter therein.

11. The modular shelter of claim 1, further comprising a main control system and a plurality of sub-control systems that comprise:
a lighting control system configured to control one or more lights mounted in the modular shelter;
a display control system configured to control a digital display mounted on an exterior surface of the unibody shell; and
a security control system configured to control access into the indoor human-occupiable environment,
the main control system configured to perform operations comprising:
monitor the indoor human-occupiable environment for a chemical, biological, or radiology threat,
deliver an audible message or alert through the indoor human-occupiable environment, and
monitor a vertical or a horizontal orientation of the unibody shell.

12. The modular shelter of claim 11, wherein the main control system is configured to wirelessly communicate to a remote computing system.

13. The modular shelter of claim 1, wherein the base comprises a plurality of slots that extend between sides of the base and are configured to receive forks of a forklift.

14. A modular shelter system, comprising:
a plurality of modular shelters, each of the modular shelters comprising:
a base;
a unibody shell coupled to the base, the shell formed to comprise a roof and at least one side to define an indoor human-occupiable environment substantially enclosed within the base and the shell, the unibody shell comprising a core structure sandwiched between an inner skin surface and an outer skin surface, the core structure comprising a honeycomb or fluted member;
a ledge that extends along a perimeter of the base and comprises a mounting surface for the unibody shell;
a gasket positioned on the mounting surface that at least partially seals an interface between the unibody shell and the base; and
one or more latches that secure the unibody shell to the base; and
a main controller positionable to generate a mesh network to communicate with the plurality of modular shelters through the mesh network, the main controller configured to communicate with a main control system installed at each modular shelter, the main control system comprising a plurality of sub-control systems that comprise a lighting control system configured to control one or more lights mounted in the modular shelter, a display control system configured to control a digital display mounted on an exterior surface of the unibody shell, and a security control system configured to control access into the indoor human-occupiable environment, the main control system configured to perform operations comprising:
monitor the indoor human-occupiable environment for a chemical, biological, or radiology threat,
deliver an audible message or alert through the indoor human-occupiable environment, and
monitor a vertical or a horizontal orientation of the unibody shell.

15. The modular shelter system of claim 14, wherein the main controller is configured to wirelessly communicate data through the mesh network to a remote monitoring system.

16. The modular shelter system of claim 15, wherein the data comprises at least one of position data, status data, message data, location data, orientation data, occupancy data, and/or configuration data.

17. The modular shelter system of claim 14, wherein the main control system is configured to communicate data to a remote data storage device for subsequent retrieval by the main control system or remote monitoring system.

18. The modular shelter system of claim 14, wherein respective unibody shells of the plurality of modular shelters are nestable, and respective bases of the plurality of modular shelters are stackable.

19. A method for deploying a plurality of modular shelters, comprising:
receiving a plurality of unibody shells of respective modular shelters, a first unibody shell nested within a volume of a second unibody shell, each of the first and second unibody shells comprising respective furniture members installed to the unibody shells in a stored position, each of the unibody shells comprising:
at least one door opening;
a ledge that extends along a perimeter of a respective base and comprises a mounting surface for the unibody shell;
a gasket positioned on the mounting surface that at least partially seals an interface between the unibody shell and the respective base;
one or more latches that secure the unibody shell to the respective base;
a door mounted in the door opening; and
one or more sensors mounted in the door opening or unibody shell that is configured to automatically determine a type of the door mounted in the door opening;
removing the first shell from within the second shell;
adjusting the furniture member of the second shell from the stored position to a deployed position such that the furniture member extends into the volume of the second shell;
setting the first unibody shell on a first base to form a first modular shelter;
setting the second unibody shell on a second base to form a second modular shelter;
connecting the respective unibody shells to the respective bases;
wirelessly coupling a main control system of each of the first and second modular shelters to a remote computing system;
monitoring, with the main control system of the second modular shelter, an indoor human-occupiable environment of the volume of the second modular shelter for a chemical, biological, or radiology threat;
deliver an audible message or alert through the indoor human-occupiable environment based on sensing the chemical, biological, or radiology threat; and
communicating the audible message or alert from the main control system of the second modular shelter to the remote computing system.

20. The method of claim 19, further comprising:
adjusting the furniture member of the first unibody shell from the stored position to a deployed position such that the furniture member extends into a volume of the first unibody shell.

21. The method of claim 19, further comprising:
unstacking the first base from the second base prior to connecting the respective unibody shells to the respective bases.

22. The method of claim 19, further comprising connecting electrical power to at least one of the plurality of modular shelters.

23. A modular shelter, comprising:
- a base that comprises a structural web member that comprises a fillable volume, the structural web member comprising:
  - a void area sized to contain or enclose one or more plumbing components or plumbing fixtures; and
  - one or more screens that cover the void area;
- a unibody shell coupled to the base, the shell formed to comprise a roof and at least one side to define an indoor human-occupiable environment substantially enclosed within the base and the shell, the unibody shell comprising a core structure sandwiched between an inner skin surface and an outer skin surface, the core structure comprising a honeycomb or fluted member;
- a ledge that extends along a perimeter of the base and comprises a mounting surface for the unibody shell;
- a gasket positioned on the mounting surface that at least partially seals an interface between the unibody shell and the base; and
- one or more latches that secure the unibody shell to the base.

* * * * *